US012797847B2

(12) United States Patent
Beckers et al.

(10) Patent No.: US 12,797,847 B2
(45) Date of Patent: Nov. 17, 2026

(54) FLUIDIC DEVICE AND METHOD OF MANUFACTURING THE SAME

(71) Applicant: KONINKLIJKE PHILIPS N.V., Eindhoven (NL)

(72) Inventors: Lucas Johannes Anna Maria Beckers, Eindhoven (NL); Edward Theodorus Maria Berben, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 459 days.

(21) Appl. No.: 18/576,775

(22) PCT Filed: Jul. 5, 2022

(86) PCT No.: PCT/EP2022/068510
§ 371 (c)(1),
(2) Date: Jan. 5, 2024

(87) PCT Pub. No.: WO2023/280808
PCT Pub. Date: Jan. 12, 2023

(65) Prior Publication Data
US 2025/0041847 A1 Feb. 6, 2025

(30) Foreign Application Priority Data
Jul. 7, 2021 (EP) .................................... 21184260

(51) Int. Cl.
*B01L 3/00* (2006.01)
*B01D 15/08* (2006.01)
(Continued)

(52) U.S. Cl.
CPC ......... *B01L 3/502707* (2013.01); *B33Y 10/00* (2014.12); *B33Y 80/00* (2014.12); *B01L 2300/0809* (2013.01); *B01L 2300/161* (2013.01)

(58) Field of Classification Search
CPC ....... B01L 3/502707; B01L 2300/0809; B01L 2300/161; B33Y 10/00; B33Y 80/00; C12M 23/16
See application file for complete search history.

(56) References Cited

U.S. PATENT DOCUMENTS

2003/0196695 A1 10/2003 O'Connor
2007/0053790 A1 * 3/2007 Nagakawa ........ B01L 3/502707 422/400

(Continued)

FOREIGN PATENT DOCUMENTS

WO 2020206729 A1 10/2020

OTHER PUBLICATIONS

International Search Report for PCT/EP2022/068510 filed Jul. 5, 2022.

*Primary Examiner* — Oyeleye Alexander Alabi

(57) ABSTRACT

Provided is a method (100) of fabricating a fluidic device (214). The method comprises providing (102, 104) a substrate (200) supporting a first body (202). A first channel (204) is defined in the first body, and a support member (206) is provided in the first channel. The method further comprises forming (106), in an additive manufacturing process, a second body (208) supported by the first body and the support member. The support member comprises at least one fluid flow path therethrough for permitting fluid transport along the first channel while the support member is supporting the second body. Further provided is the fluidic device per se, which fluidic device comprises the first body, the support member in the first channel defined in the first body, and the additive manufactured second body supported by the first body and the support member.

15 Claims, 4 Drawing Sheets

(51) Int. Cl.

| | |
|---|---|
| ***B01F 33/302*** | (2022.01) |
| ***B01F 33/3033*** | (2022.01) |
| ***B01J 8/00*** | (2006.01) |
| ***B01J 8/02*** | (2006.01) |
| ***B01J 20/285*** | (2006.01) |
| ***B01J 20/287*** | (2006.01) |
| ***B01J 20/32*** | (2006.01) |
| ***B01L 7/00*** | (2006.01) |
| ***B01L 9/00*** | (2006.01) |
| ***B33Y 10/00*** | (2015.01) |
| ***B33Y 80/00*** | (2015.01) |
| ***B65G 47/80*** | (2006.01) |
| ***B82Y 20/00*** | (2011.01) |
| ***B82Y 30/00*** | (2011.01) |
| ***B82Y 40/00*** | (2011.01) |
| ***C08L 5/08*** | (2006.01) |
| ***C12M 1/34*** | (2006.01) |
| ***C12M 3/06*** | (2006.01) |
| ***C12N 1/14*** | (2026.01) |
| ***C12N 1/20*** | (2026.01) |
| ***C12Q 1/02*** | (2006.01) |
| ***C12Q 1/6806*** | (2018.01) |
| ***C12Q 1/6844*** | (2018.01) |
| ***C12Q 1/6848*** | (2018.01) |
| ***C12Q 1/6851*** | (2018.01) |
| ***C12Q 1/686*** | (2018.01) |
| ***G01K 1/14*** | (2021.01) |
| ***G01N 1/44*** | (2006.01) |
| ***G01N 15/10*** | (2024.01) |
| ***G01N 15/14*** | (2024.01) |
| ***G01N 15/1433*** | (2024.01) |
| ***G01N 21/01*** | (2006.01) |
| ***G01N 21/03*** | (2006.01) |
| ***G01N 21/05*** | (2006.01) |
| ***G01N 21/29*** | (2006.01) |
| ***G01N 21/33*** | (2006.01) |
| ***G01N 21/35*** | (2014.01) |
| ***G01N 21/59*** | (2006.01) |
| ***G01N 21/65*** | (2006.01) |
| ***G01N 21/75*** | (2006.01) |
| ***G01N 21/77*** | (2006.01) |
| ***G01N 27/07*** | (2006.01) |
| ***G01N 27/28*** | (2006.01) |
| ***G01N 27/416*** | (2006.01) |
| ***G01N 30/02*** | (2006.01) |
| ***G01N 30/60*** | (2006.01) |
| ***G01N 30/72*** | (2006.01) |
| ***G01N 31/10*** | (2006.01) |
| ***G01N 31/12*** | (2006.01) |
| ***G01N 33/543*** | (2006.01) |
| ***G01N 33/557*** | (2006.01) |
| ***G01N 33/564*** | (2006.01) |
| ***G01N 33/574*** | (2006.01) |
| ***G01N 33/575*** | (2026.01) |
| ***G01N 33/57515*** | (2026.01) |
| ***G01N 33/58*** | (2006.01) |
| ***G01N 33/68*** | (2006.01) |
| ***G01N 33/72*** | (2006.01) |
| ***G01N 35/00*** | (2006.01) |
| ***G01N 35/02*** | (2006.01) |
| ***H05B 45/10*** | (2020.01) |
| ***H10W 90/00*** | (2026.01) |

(56) References Cited

U.S. PATENT DOCUMENTS

| | | | | |
|---|---|---|---|---|
| 2009/0120865 | A1* | 5/2009 | Chung | G01N 33/491<br>210/232 |
| 2012/0301903 | A1 | 11/2012 | Putnam | |
| 2016/0158750 | A1 | 6/2016 | Putnam | |
| 2017/0012917 | A1 | 1/2017 | Yang | |
| 2018/0126375 | A1 | 5/2018 | Saggiomo | |
| 2018/0353958 | A1 | 12/2018 | Hinojosa | |
| 2019/0083979 | A1* | 3/2019 | Hosic | B01L 3/502707 |
| 2020/0016829 | A1 | 1/2020 | Ameloot | |
| 2020/0047399 | A1 | 2/2020 | Guvendiren | |
| 2022/0111381 | A1 | 4/2022 | Larramendy | |
| 2022/0280936 | A1 | 9/2022 | Beckwith | |
| 2023/0159872 | A1 | 5/2023 | Varone | |

* cited by examiner

FLUIDIC DEVICE AND METHOD OF MANUFACTURING THE SAME

CROSS-REFERENCE TO PRIOR APPLICATIONS

This application claims the priority benefit under 35 U.S.C. § 371 of International Patent Application No. PCT/EP2022/068510, filed on Jul. 5, 2022, which claims the priority benefit of EP patent application Ser. No. 21/184,260.4, filed on Jul. 7, 2021, the contents of which are herein incorporated by reference.

FIELD OF THE INVENTION

This invention relates to a method of manufacturing a fluidic device.

The invention further relates to a fluidic device.

BACKGROUND OF THE INVENTION

Fluidic devices can be used in a number of different applications, such as for cell or tissue culturing, for example for biopsy study. So-called organ-on-chip devices use microfluidics along with cells to imitate the physiological and mechanical conditions experienced in the body. Such organ-on-chip devices have found utility in, for instance, oncology.

Fluidic devices can include two or more fluid channels for carrying fluids to a culturing chamber. One channel can be used, for example, to provide nutrients and oxygen to the culturing chamber, as well as to remove metabolic products such as carbon dioxide therefrom. A further channel can be used to provide medication to the culturing chamber. In such an example, the channels can be arranged at different depths of the fluidic device, such that one of the channels is positioned on top of, albeit separated from, the other channel.

Additive manufacturing processes, also referred to as 3D printing, can be used to fabricate such fluidic devices. However, employing such processes can be hampered by the requirement for numerous manufacturing steps.

Such manufacturing steps can include disposing a membrane layer over a channel defined in an initially formed body so that a further body can be formed via additive manufacturing on top of the membrane. It is also known to fill a channel with a sacrificial material in order for a further body to be printed thereon. However, the sacrificial material must be removed in a subsequent step so that fluid can flow in the channel. Water-soluble polymers, such as polyvinyl alcohol, have been used as sacrificial materials for this purpose. By way of illustration, manufacture of a lung-on-chip device developed by the Wyse Institute requires 128 processing steps.

A further challenge is that additive manufactured fluidic devices may have increased propensity for fluid leakage, particularly when the above-described membrane layer is used in the manufacturing process to support the further body being printed thereon. This is because the fluidic device can leak at the interfaces between the bodies and the membrane.

WO 2016/155760 A1 discloses a method of manufacturing a microfluidic device comprising placing a length of material in a liquid polymer, configuring the length of material to define the path of a microfluidic channel, curing or setting the liquid polymer to form a solid polymer around the configured length of material, and dissolving the configured length of material with a solvent to provide a microfluidic channel in the solid polymer. The configured length of material can accordingly be regarded as a sacrificial material whose removal enables fluid to flow along the microfluidic channel but adds a step to the manufacturing method.

SUMMARY OF THE INVENTION

The invention is defined by the claims.

According to examples in accordance with an aspect of the invention, there is provided a method of fabricating a fluidic device, the method comprising: providing a substrate supporting a first body, in which first body a first channel is defined, wherein a support member is provided in the first channel; and forming, in an additive manufacturing process, a second body supported by the first body and the support member, wherein the support member comprises at least one fluid flow path therethrough for permitting fluid transport along the first channel while the support member is supporting the second body.

The support member in the first channel obviates the requirement to provide a cover plate or membrane over the first channel in order to form the second body on the first body. This can reduce the number of manufacturing steps and mitigate the risk of fluid leakage compared to the scenario in which such a cover plate or membrane is provided between the first and second bodies.

Moreover, the support member need not be removed from the first channel in order for the fluidic device to function. This is because the support member comprises the at least one fluid flow path therethrough for permitting fluid transport along the first channel while the support member is supporting, in other words after forming of, the second body. This also assists to reduce the number of steps required for the manufacture of the fluidic device. Thus, the support member can be regarded as being a non-sacrificial support for the second body.

The providing the substrate supporting the first body may comprise forming, in an initial additive manufacturing process, the first body and the support member on the substrate. Thus, the first body, the support member, and the second body can be formed via additive manufacturing. The overall additive manufacturing process thus involves forming, e.g. printing, the first body and the support member on the substrate, and subsequently forming, e.g. printing, the second body on the first body and the support member. Manufacture of the fluidic device may be correspondingly simplified and manufacturing throughput increased.

The term "additive manufacturing process" as used herein means forming a three-dimensional component, which three-dimensional component is the second body, and in at least some embodiments the first body and the support member, by depositing, joining and/or solidifying a material under computer control, with the material being added together, typically layer by layer.

Any suitable material can be used in such an additive manufacturing process, such as plastics, liquids or powder grains which can be cured or fused together.

Non-limiting examples of additive manufacturing processes include stereolithography, digital light processing, and polyjet printing.

Forming the support member in the initial additive manufacturing process may comprise forming a stack of layers in the region of the first channel, with each layer of the stack comprising a plurality of spatially separated portions. In such an embodiment, the at least one fluid flow path is provided by the spaces between the spatially separated portions.

The layers of such a stack may, for example, be built as the first body is being formed (also) layer-wise during the initial additive manufacturing process.

The spatially separated portions in each layer of the stack may, for instance, comprise a plurality of separate strands extending parallel with each other in the layer.

This may provide a structure in which a layer of parallel strands is disposed over another layer of parallel strands. The resulting stack of porous layers forms a porous support member, and thus effectively a porous first channel. Such a porous support member can support the portion of the second body formed thereon, such that the second body can cover the first channel to provide a fluidic channel.

The direction of extension of the strands relative to the direction in which the first channel extends may vary between layers of the stack. In a non-limiting example, the direction of extension of the strands alternates in successive layers. This stack structure can assist the support member to support the second body.

Each of the strands, e.g. printed strands, may be, for example, 150 μm to 225 μm wide. Such a strand width can assist each layer of the stack to support the layer(s) above, and the second body disposed on the support member.

Alternatively or additionally, the pore size or the distance between nearest-neighbor strands of the same layer may be 50 μm to 200 μm and/or the support member may have a porosity in the range of 10% to 50%. This may assist to ensure fluid flow through the first channel, while enabling the support member to support the second body.

It is noted that the porosity or void fraction is a measure of the void spaces in the support member, and is a fraction of the volume of voids over the total volume of the support member.

More generally, the support member may comprise, or be defined by, a porous structure whose pores define the at least one fluid flow path. Such a porous structure can have a porosity in the range of 10% to 50%.

The porous structure can provide various functional benefits. For example, the porous structure can reduce the volume of the first channel, relative to a channel in which no such porous structure is present. In examples in which cells are treated, e.g. in a culturing chamber connected to the first channel, the fluidic device may be used to supply expensive medicaments to the culturing chamber via the first channel. Larger volume channels may risk wasting such medicaments in their "dead volume". The porous structure may assist to reduce this dead volume.

In other examples, the porous structure can function as a static mixer. When, for instance, two or more medicaments are separately injected into the first channel, the static mixer function of the porous structure can assist to mix the two or more medicaments together.

In further examples, the porous structure can function as a filter. In cell culturing applications, various different types of life can grow within the fluidic device. For example, flat layers of cells can be formed and in other cases spheroids and organoids can grow. However, such spheroids and organoids can risk being flushed away if they do not strongly adhere to the cell culture medium. In such an example, the porous structure can serve to filter or retain the spheroids and organoids, e.g. having dimensions of 200 μm to 500 μm, so that they are easily traceable and will not be lost to and/or clog a fluid controller external to the fluidic device.

More generally, such a porous structure may comprise a structure including interlaced strands, wherein the at least one fluid flow path is provided between the interlaced strands. Such interlaced strands may, for example, correspond to the above-described stack of layers of spatially separated strands formed via the initial additive manufacturing process.

In some embodiments, the support member is formed of a support material whose hardness, e.g. Shore A hardness, is greater than that of a material forming the first body and/or the second body. This may assist to minimize the risk of restriction of the at least one fluid flow path by forces applied during subsequent fabrication steps, for example to clamp the fluidic device together in a holder.

Alternatively or additionally, the support material is hydrophobic and the material forming the first body and/or the second body is hydrophobic. Thus, the support material may be wettable by the material forming the first body and/or the second body. This may assist to improve adhesion between the support member and the respective body or bodies.

More generally, the support material may be, or comprise, a thermoplastic.

Such a thermoplastic may comprise or consist of a polyolefin, such as one or more selected from polyethylene (PE), polypropylene (PP), and polystyrene (PS).

In some embodiments, a second channel is defined in the second body. The first and second channels may thus be provided at different depths or thickness positions in the structure defined by the first and second bodies. This arrangement is facilitated by the support member being provided in the first channel for supporting the second body.

The support member may, for example, enable a "cross channel" configuration to be realized in which the at least part of the second channel aligns with the first channel in a direction normal to the substrate.

A portion of the second body may be interposed between the second channel and the support member. Thus, the respective fluids in the first and second channels can be kept separate from each other during use of the fluidic device.

The portion of the second body interposed between the second channel and the support member may, for example, have a thickness or depth of at least 600 μm. This may assist to ensure that the fluids in the first and second channels are kept separated from each other.

The first and second channels can have any suitable dimensions. The first channel may, for example, have a width and a depth of at least 600 μm to assist fluid flow therethrough.

The method may further comprise applying a cover member to the second body to cover the second channel. The cover member may assist to retain fluid in the second channel during use of the fluidic device.

The substrate and the cover member (when present) can comprise or be formed of any suitable material, such as an optically transmissive or optically transparent material. This can assist monitoring of the processes taking place within the fluid device, since the first channel can be viewed or optically monitored through the substrate, and, where applicable, the second channel can be viewed or optically monitored through the cover member.

The optically transmissive material may, for instance, be glass or a suitable optically transmissive or transparent polymer, such as a cyclic olefin polymer (COP) or a cyclic olefin copolymer (COC).

At least one of the first body and the second body may be formed of a thermoplastic elastomer and/or a material having a Shore A hardness of 20 to 70, such as 20 to 40. The Shore A hardness can be determined using ASTM D2240-15e1.

A thermoplastic elastomer may facilitate forming of the respective body by additive manufacturing because the thermoplastic elastomer can be applied as a liquid, e.g. via a suitable melt extruder-printing head arrangement, which then cools/solidifies relatively rapidly following application.

The elastomeric properties of a thermoplastic elastomer, such as styrene-ethylene-butadiene-styrene elastomer (SEBS), may be provided without crosslinking, thereby facilitating additive manufacturing using such a material.

At least one of the first body and the second body may be formed of an optically transparent or translucent material, e.g. an optically transparent or translucent thermoplastic elastomer, such as an optically transparent or translucent thermoplastic elastomer having a Shore A hardness of 20 to 70. This may facilitate optical interrogation of processes taking place within the fluidic device.

Alternatively or additionally, the first and/or second body may be formed of a material which is food contact approved.

The first body being formed of a thermoplastic elastomer can assist to reduce fluid leakage from the fluidic device because the first body may be resiliently deformed against the substrate in order to seal the first body to the substrate, e.g. when the fluidic device is clamped together.

Alternatively or additionally, the second body being formed of a thermoplastic elastomer may assist to reduce fluid leakage by, for example, enabling the second body to be resiliently deformed against the cover member in order to seal the second body to the cover member, e.g. when the fluidic device is clamped together.

Non-elastomeric materials, such as thermoplastics, e.g. polyolefins, can also be considered for the first body and/or the second body. In such examples, a suitable adhesive may be used to adhere the first body to the substrate and/or adhere the second body to a suitable cover member (when included in the fluidic device). Employing a thermoplastic elastomer-formed first and/or second body may, however, obviate the requirement for such an adhesive, and thereby reduce the risk of contaminating the interior of the fluidic device, e.g. cell culturing environment, with such an adhesive.

The thermoplastic elastomer may be, for example, styrene-ethylene-butadiene-styrene elastomer (SEBS), a thermoplastic polyurethane (TPU), and/or a thermoplastic silicone vulcanizate (TPSiV).

When, for example, such a thermoplastic elastomer (e.g. SEBS, TPU or TPSiV) is combined with a thermoplastic, e.g. polyolefin, support material (e.g. PE, PP or PS) for the support member, the hydrophobicity of the materials of the support member and the body/bodies may be such that the former wets the latter, thereby to enhance adhesion.

Moreover, such a polyolefin support material (e.g. PE, PP or PS) may be harder, e.g. have a higher Shore A hardness, than, for example, a styrene-ethylene-butadiene-styrene elastomer (SEBS), a thermoplastic polyurethane (TPU), and/or a thermoplastic silicone vulcanizate (TPSiV) used for the first and/or second body, thereby to minimize the risk of restriction of the at least one fluid flow path, as previously described.

According to another aspect there is provided a fluidic device comprising: a first body in which a first channel is defined, wherein a support member is provided in the first channel; and an additive manufactured second body supported by the first body and the support member, wherein the support member comprises at least one fluid flow path therethrough for permitting fluid transport along the first channel.

A second channel may be defined in the second body. In such an embodiment, the fluidic device may further comprise a cover member on the second body, which cover member covers the second channel.

More generally, embodiments described herein in relation to the fluidic device may be applicable to the method of manufacturing the fluidic device, and embodiments described herein in relation to the method of manufacturing the fluidic device may be applicable to the fluidic device itself.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
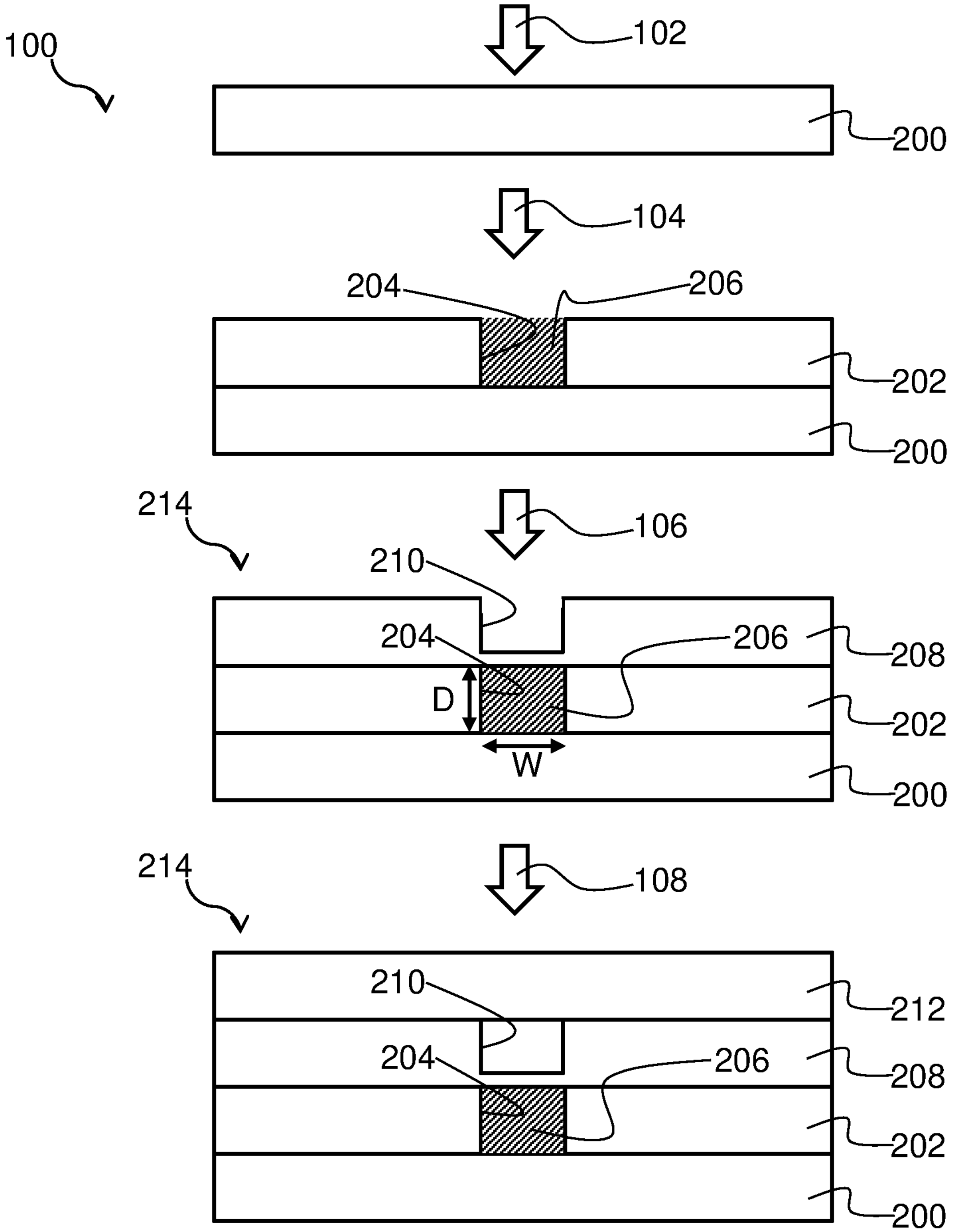
FIG. 1 schematically depicts a method of manufacturing a fluidic device according to an example.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is a method of fabricating a fluidic device. The method comprises providing a substrate supporting a first body. A first channel is defined in the first body, and a support member is provided in the first channel. The method further comprises forming, in an additive manufacturing process, a second body supported by the first body and the support member. The support member comprises at least one fluid flow path therethrough for permitting fluid transport along the first channel while the support member is supporting the second body. Further provided is a fluidic device comprising the first body, the support member in the first channel defined in the first body, and the additive manufactured second body supported by the first body and the support member.

FIG. 1 schematically depicts a method 100 for fabricating a fluidic device according to a non-limiting example. The method 100 comprises providing a substrate 200 supporting a first body 202, in which a first body 202 and a first channel 204 is defined. A support member 206 is provided in the first channel.

The providing the substrate 200 supporting the first body 202 is represented in FIG. 1 by the separate steps of providing 102 the substrate 200, and forming 104 the first body 202 and the support member 204 on the substrate 200.

The substrate 200 can be formed of any suitable material provided that the substrate is capable of supporting layers or other structures of the fluidic device formed thereon. The substrate 200 can, for example, be formed of glass or an optically transmissive or optically transparent polymer. This can assist monitoring of the processes taking place within the fluid device, since the first channel can be viewed or optically monitored through the substrate. The optically transmissive or transparent polymer may be, for example, a cyclic olefin polymer (COP) or a cyclic olefin copolymer (COC).

Preferably, an initial additive manufacturing process is used to form 104 the first body 202 and the support member 206 on the substrate 200.

The first body 202 can be formed of any suitable material, in particular a polymeric material. In some embodiments, the first body 202 is formed of a thermoplastic elastomer. Such a thermoplastic elastomer can be resiliently deformed against the substrate 200, for example, by the force exerted by a clamp or holder (not visible) for clamping the fluidic device together. Such deformation of the elastomeric first body 202 may assist to provide a seal against the substrate 200 for retaining fluid within the first channel 204.

A thermoplastic elastomer may facilitate forming of the first body 202 by additive manufacturing because the thermoplastic elastomer can be applied as a liquid, e.g. via a suitable melt extruder-printing head arrangement, such as that included in the Arburg Freeformer System, which then cools/solidifies relatively rapidly following application.

The elastomeric properties of a thermoplastic elastomer, such as styrene-ethylene-butadiene-styrene elastomer (SEBS), may be provided without crosslinking, thereby facilitating additive manufacturing using such a material.

The first body 202 may comprise, or be formed of, at least one selected from a styrene-ethylene-butadiene-styrene elastomer (SEBS), a thermoplastic polyurethane (TPU), and a thermoplastic silicone vulcanizate (TPSiV).

The method 100 further comprises forming 106, in an additive manufacturing process, in this particular example a subsequent additive manufacturing process, a second body 208 supported by the first body 202 and the support member 206. Thus, the support member 206 and the first body 202 can be regarded as together providing a supporting substrate on which the second body 208 can be formed via additive manufacturing.

Hence in this example, the first body 202, the support member 206, and the second body 208 can be formed via additive manufacturing. The overall additive manufacturing process thus involves forming, e.g. printing, the first body 202 and the support member 206 on the substrate 200, and subsequently forming the second body 208 on the first body 202 and the support member 206. Manufacture of the fluidic device 214 may be correspondingly simplified and manufacturing throughput increased.

In a non-limiting example, the first and second bodies 202, 204 and the support member 206 are printed using a relatively soft material, for example having a Shore A hardness of 20 to 40, in a printing time of 3 to 5 minutes. The printing process may be a continuous process, programmed, for example, by an additive manufacturing machine from Arburg. The manufacturing time may be limited by the frequency of making dots to print. Printing 1.2 grams of the relatively soft material may take, for instance, about 3 minutes.

Assuming that the time required to implement steps 102 and 104 of the method 100 shown in FIG. 1 is 4 minutes and assuming 360 days per year operation in three shifts per printer, it is estimated that this process can manufacture 131400 fluidic devices 214 per year.

More generally, any suitable type of additive manufacture process can be employed for the additive manufacture steps described herein, such as stereolithography, digital light processing, and polyjet printing. For processing/printing harder materials, laser solidification can be used. Such additive manufacturing processes are well-known per se and will not be described in further detail herein for the sake of brevity only.

The support member 206 in the first channel 204 obviates the requirement to provide a cover plate or membrane over the first channel 204 in order to form the second body 208 on the first body 202. This can reduce the risk of fluid leakage compared to the scenario in which such a cover plate or membrane is provided between the first and second bodies 202, 208.

Moreover, the support member 206 need not be removed from the first channel 204 in order for the resulting fluidic device 214 to function. This is because the support member 206 comprises at least one fluid flow path therethrough for permitting fluid transport along the first channel 204 while the support member 206 is supporting the second body 208. This also assists to reduce the number of steps required for the manufacture of the fluidic device 214. Thus, the support member 206 can be regarded as being a non-sacrificial support for the second body 208.

The fluid flow path included in the support member 206 can be implemented in any suitable manner. In some embodiments, the support member 206 comprises or is defined by a porous structure whose pores define the at least one fluid flow path. Such a porous structure can, for example, have a porosity in the range of 10% to 50%.

The porous structure can provide various functional benefits. For example, the porous structure can reduce the volume of the first channel 204, for instance relative to a channel in which no such porous structure is present. In examples in which cells are treated, e.g. in a culturing chamber (not visible in FIG. 1) connected to the first channel, the fluidic device 214 may be used to supply expensive medicaments to the culturing chamber via the first channel 204. Larger volume channels may risk wasting such medicaments in their “dead volume”. The porous structure may assist to reduce this dead volume.

In other examples, the porous structure can function as a static mixer. When, for instance, two or more medicaments are separately injected into the first channel, the static mixer function of the porous structure can assist to mix the two or more medicaments together.

In further examples, the porous structure can function as a filter. In cell culturing applications, various different types of life can grow within the fluidic device 214. For example, flat layers of cells can be formed and in another cases spheroids and organoids can grow. However, such spheroids and organoids can risk being flushed away if they do not strongly adhere to the cell culture medium. In such an example, the porous structure can serve to filter or retain the spheroids and organoids, e.g. having dimensions of 200 μm to 500 μm, so that they are easy traceable and will not be lost to and/or clog a fluid controller external to the fluidic device 214.

More generally, the support member may comprise or be formed of any suitable support material, such as a thermoplastic, e.g. a polyolefin. Such a polyolefin can include, for instance, one or more of polyethylene (PE), polypropylene (PP), and polystyrene (PS).

In the non-limiting example shown in FIG. 1, a second channel 210 is defined in the second body 208. The first and second channels 204, 210 are thus provided at different heights or thickness positions in the laminate structure defined by the first and second bodies 202, 208. This arrangement is facilitated by the support member 206 being provided in the first channel 204 for supporting the second body 208, as previously described.

In particular, the support member 206 enables a "cross channel" configuration to be realized in which at least part of the second channel 210 aligns with the first channel 204 in a direction normal to the substrate. In the non-limiting example shown in FIG. 1, the first and second channels 204, 210 align and extend parallel with each other, although other stacked arrangements of the first and second channels 204, 210 can also be contemplated.

In such embodiments, a portion of the second body 208 may be interposed between the second channel 210 and the support member 206. Thus, the respective fluids in the first and second channels 204, 210 can be kept separate from each other.

The portion of the second body interposed between the second channel and the support member may, for example, have a thickness or depth of at least 600 μm. This may assist to keep the respective fluids in the first and second channels 204, 210 separate from each other.

The first and second channels 204, 210 can have any suitable dimensions. The first channel 204 may, for example, have a width (W) and a depth (D) of at least 600 μm to assist fluid flow therethrough.

In the non-limiting example shown in FIG. 1, the method 100 further comprises applying 108 a cover member 212 to the second body 208 to close the second channel 210.

The cover member 212 can be formed of any suitable material provided that the cover member 212 is capable of closing the second channel 210 to retain fluid therein. The cover member 212 can, for example, be formed of glass or an optically transmissive or optically transparent polymer. This can assist monitoring of the processes taking place within the fluid device, since the first channel can be viewed or optically monitored through the cover member 212. The optically transmissive or transparent polymer may be, for example, a cyclic olefin polymer (COP) or a cyclic olefin copolymer (COC).

The second body 208 can be formed of any suitable material, in particular a polymeric material. In some embodiments, the second body 208 is formed of a thermoplastic elastomer. Such a thermoplastic elastomer can be resiliently deformed against the cover member 212, for example, by the force exerted by a clamp or holder (not visible) for clamping the fluidic device 214 together. Any suitable holder can be considered for this purpose, for example the platform provided by Micronit GmbH/Fluigent. Such deformation of the elastomeric second body 208 may assist to provide a seal against the cover member 212 for retaining fluid within the second channel 210.

A thermoplastic elastomer may facilitate forming of the second body 208 by additive manufacturing because the thermoplastic elastomer can be applied as a liquid, e.g. via a suitable melt extruder-printing head arrangement, such as that included in the Arburg Freeformer System, which then cools/solidifies relatively rapidly following application.

The elastomeric properties of a thermoplastic elastomer, such as styrene-ethylene-butadiene-styrene elastomer (SEBS), may be provided without crosslinking, thereby facilitating additive manufacturing using such a material.

The second body 208 may comprise, or be formed of, at least one selected from a styrene-ethylene-butadiene-styrene elastomer (SEBS), a thermoplastic polyurethane (TPU), and a thermoplastic silicone vulcanizate (TPSiV).

Non-elastomeric materials can also be considered for the first body 202 and/or the second body 208. In such examples, a suitable adhesive may be used to adhere the first body 202 to the substrate 200 and/or adhere the second body 208 to the cover member 212. Employing an elastomeric, e.g. thermoplastic elastomer-formed, first and/or second body 202, 208 may, however, obviate the requirement for such an adhesive, and thereby reduce the risk of contaminating the interior of the fluidic device, e.g. cell culturing environment, with such an adhesive.

In some embodiments, the support member 206 is formed of a support material whose hardness, e.g. Shore A hardness, is greater than that of a material forming the first body 202 and/or the second body 208. This may assist to minimize the risk of restriction of the at least one fluid flow path by forces applied during subsequent fabrication steps, for example to clamp the fluidic device 214 together in a holder.

A polyolefin support material (e.g. PE, PP or PS), for instance, may be harder, e.g. have a higher Shore A hardness, than a styrene-ethylene-butadiene-styrene elastomer (SEBS), a thermoplastic polyurethane (TPU), and/or a thermoplastic silicone vulcanizate (TPSiV) included in or forming the first and/or second body 202, 208. Such a combination may therefore minimize the risk of restriction of the at least one fluid flow path.

Alternatively or additionally, the support material and the material forming the first body 202 and/or the second body 208 are both hydrophobic. Thus, the support material may be wettable by the material forming the first body 202 and/or the second body 208. This may assist to improve adhesion between the support member 206 and the respective body or bodies 202, 208.

When, for example, a styrene-ethylene-butadiene-styrene elastomer (SEBS), a thermoplastic polyurethane (TPU), and/or a thermoplastic silicone vulcanizate (TPSiV) is combined with a polyolefin support material (e.g. PE, PP or PS) for the support member, the hydrophobicity of the materials of the support member 206 and the body/bodies 202, 208 may be such that the former wets the latter, thereby to enhance adhesion.

In order to form the first body 202 and the support member 206 using respective materials concurrently in the initial additive manufacturing process, additive manufacturing equipment having a plurality of melt extruder-printing head arrangements can be used. In such an example, a melt extruder-printing head arrangement can be controlled to print the support material, e.g. thermoplastic, such as PE, PP or PS, of the support member 206, while a different melt extruder-printing head arrangement can be used to print the first body 202, e.g. using a thermoplastic elastomer, such as SEBS, TPU or TPSiV.

Suitable additive manufacturing equipment is known having such a plurality of melt extruder-printing head arrangements, such as the Arburg Freeformer. In the latter, the substrate 200 may be positioned on a movable product plate, which product plate is controlled to move relative to the plurality of statically mounted printing heads.

In order to simplify manufacture of the fluidic device 214, in some non-limiting examples, the first body 202, the support member 206, and the second body 208 may all be formed of the same material. The common material may be, for example, a thermoplastic elastomer, e.g. a styrene-ethylene-butadiene-styrene elastomer (SEBS), a thermoplastic polyurethane (TPU) or a thermoplastic silicone vulcanizate (TPSiV), or a polyolefin, e.g. PE, PP or PS.

Figure 2:
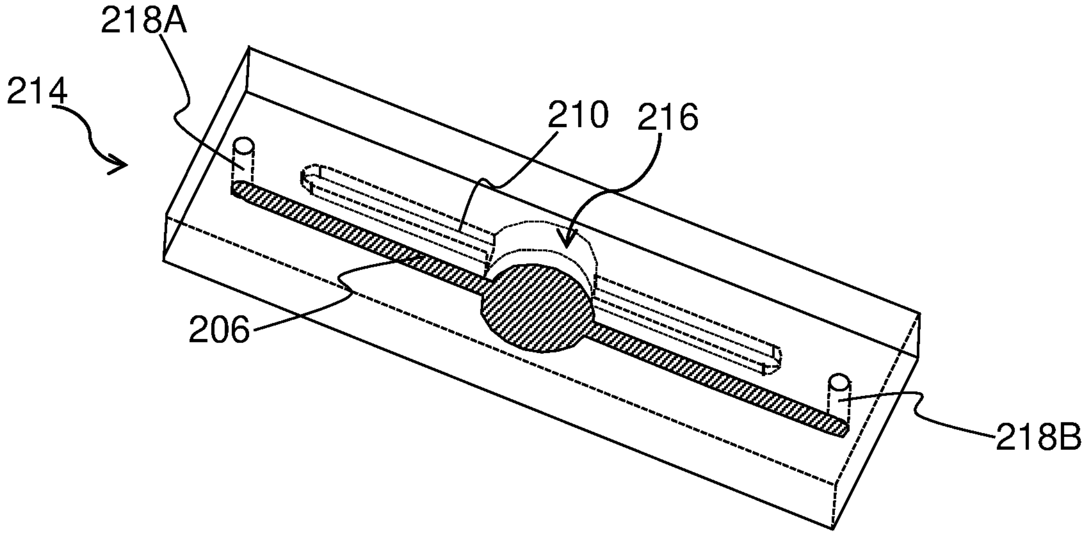
FIG. 2 provides a perspective view of a fluidic device according to an example, which fluidic device comprises a first body having a first channel defined therein and a second body having a channel second defined therein.
Figure 3:
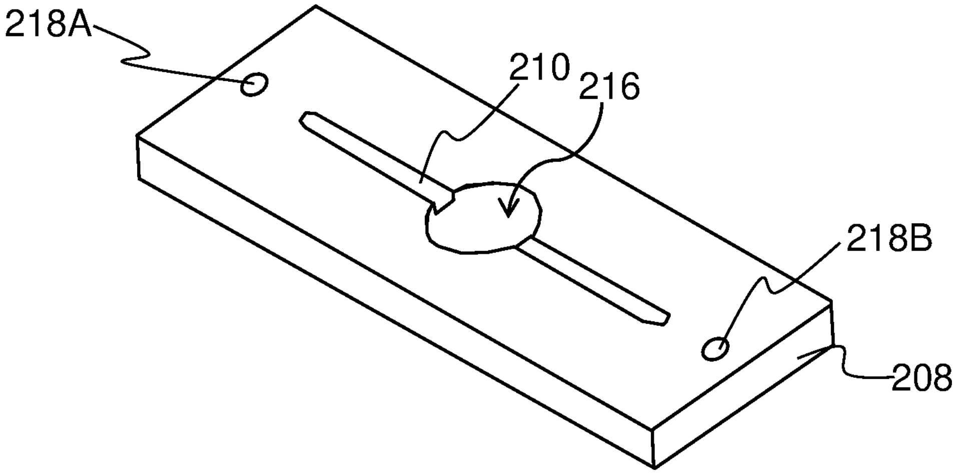
FIG. 3 provides a perspective view of the second body of the fluidic device shown in FIG. 2.

FIG. 2 provides a perspective view of a fluidic device 214 according to a non-limiting example. FIG. 3 provides a perspective view of the second body 208 of the fluidic device 214 shown in FIG. 2, and FIG. 4 provides a perspective view of the first body 202 of the fluidic device shown in FIG. 2.

The fluidic device 214 comprises the above-described support member 206 included in the first channel 204, with the second channel 210 being stacked on, albeit separated in the depth direction from, the first channel 204. Portions of the stacked first and second channels 204, 210 extend parallel with each other, as shown.

Figure 4:
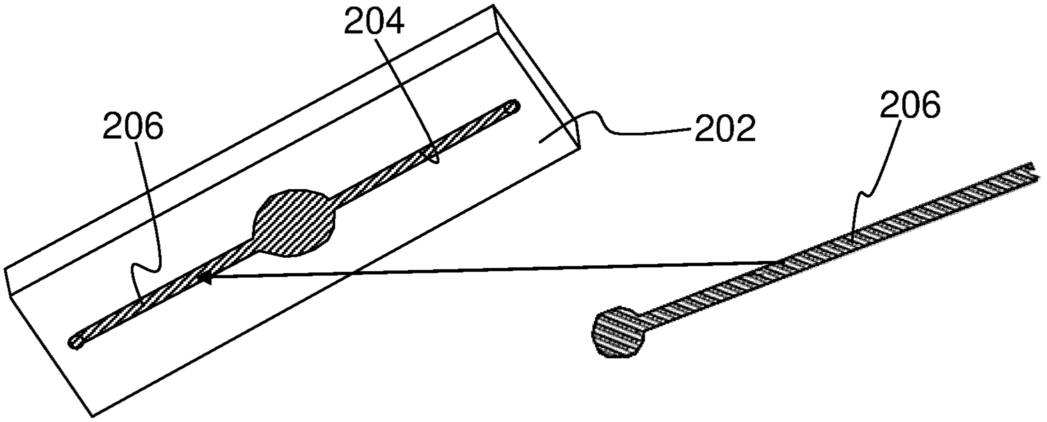
FIG. 4 provides a perspective view of the first body of the fluidic device shown in FIG. 2.

In the non-limiting example shown in FIGS. 2 to 4, the fluidic device 214 also includes a chamber 216, e.g. a cell culturing chamber 216, fluidly connected to the first channel 204 and the second channel 210. In this manner, the first channel 204 and the second channel 210 can supply fluids, e.g. different fluids, to the chamber 216. The at least one flow path in the support member 206 enables the fluid to flow in the first channel 204 to the chamber 216.

For example, one of the first and second channels 204, 210 can be used to provide nutrients and oxygen to the chamber 216, as well as to remove metabolic products such as carbon dioxide therefrom, while the other of the first and second channels 210, 204 can be used to provide medication to the chamber 216.

Fluid can be supplied into, and removed from, the first channel 204 via the inlet and outlet 218A, 218B. As best shown in FIG. 3, the inlet and outlet 218A, 218B are defined in the second body 208. The inlet and outlet 218A, 218B are, in particular, aligned with end portions of the first channel 204, as best shown in FIG. 2.

Whilst not visible in FIGS. 2 to 4, an inlet and an outlet may also be included for supplying fluid to and remove fluid from the second channel 210.

The fluidic device 214 may comprise one or more functional materials which are biocompatible with cells. Such functional materials may, for example, be provided at or proximal to the center of the fluidic device 214, e.g. in the chamber 216, where, for instance, cells or biopsies are treated.

Other parts of the fluidic device 214, such as the channel(s) 204, 210, and most of the bulk, e.g. first and second bodies 202, 208, of the fluidic device 214 can, for instance, be made of non-functional materials which are not included for biocompatibility reasons.

Figure 5A:
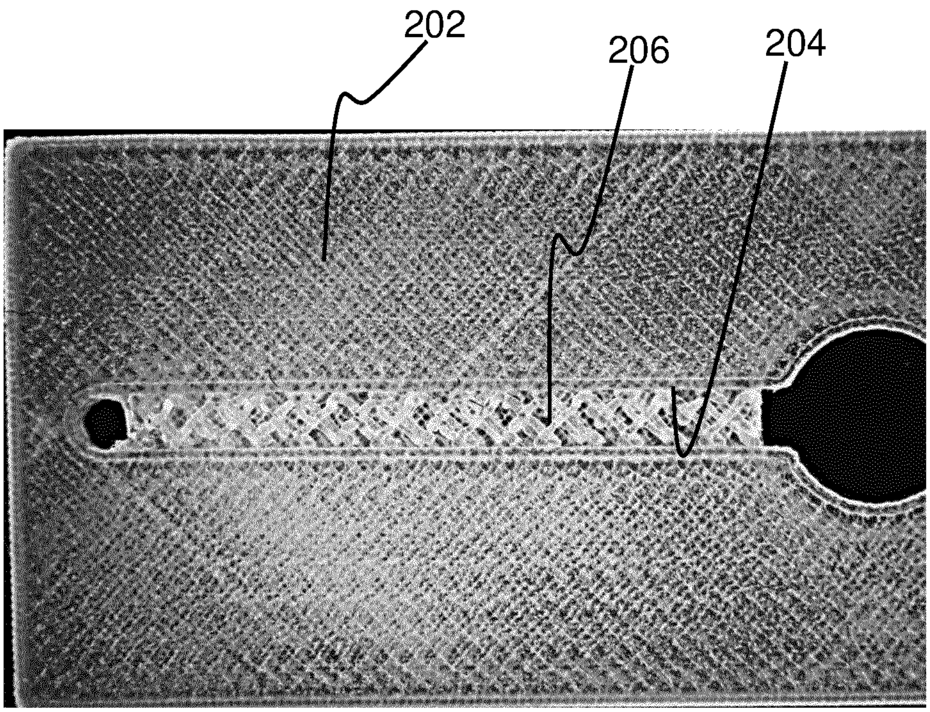
FIG. 5A provides a photograph of a first body and support member of an exemplary fluidic device.
Figure 5B:
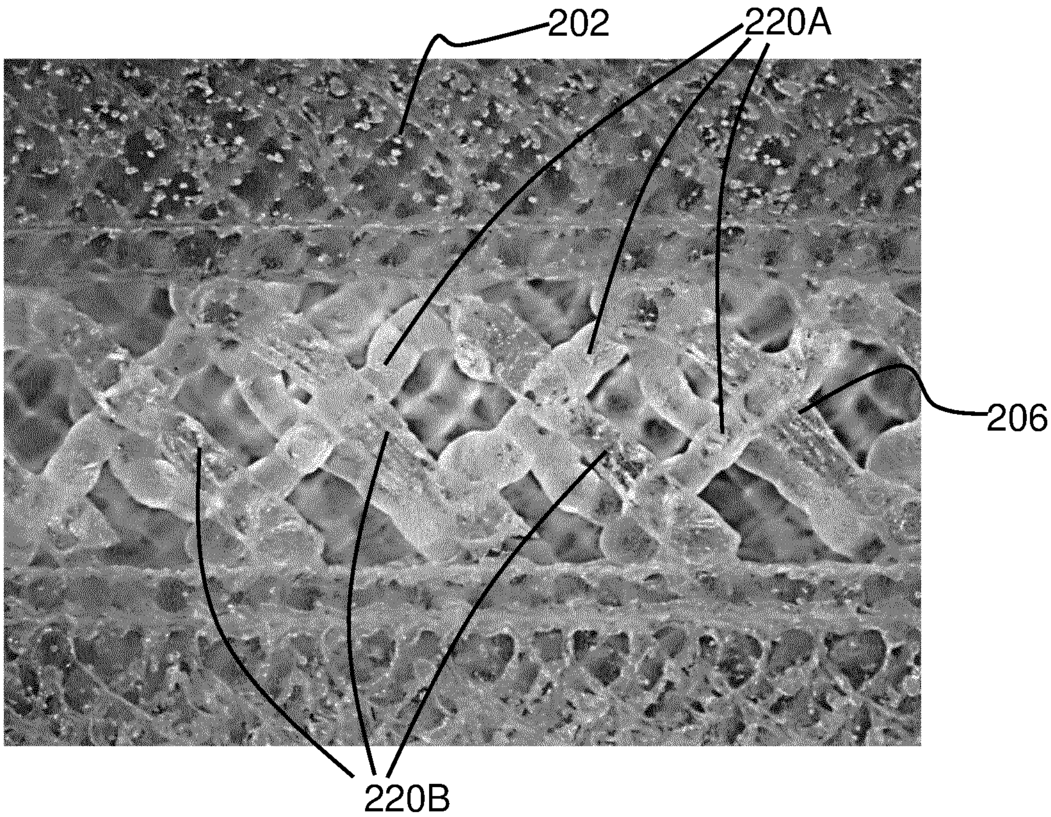
FIG. 5B provides an enlarged view of the support member shown in FIG. 5A.
Figure 5C:
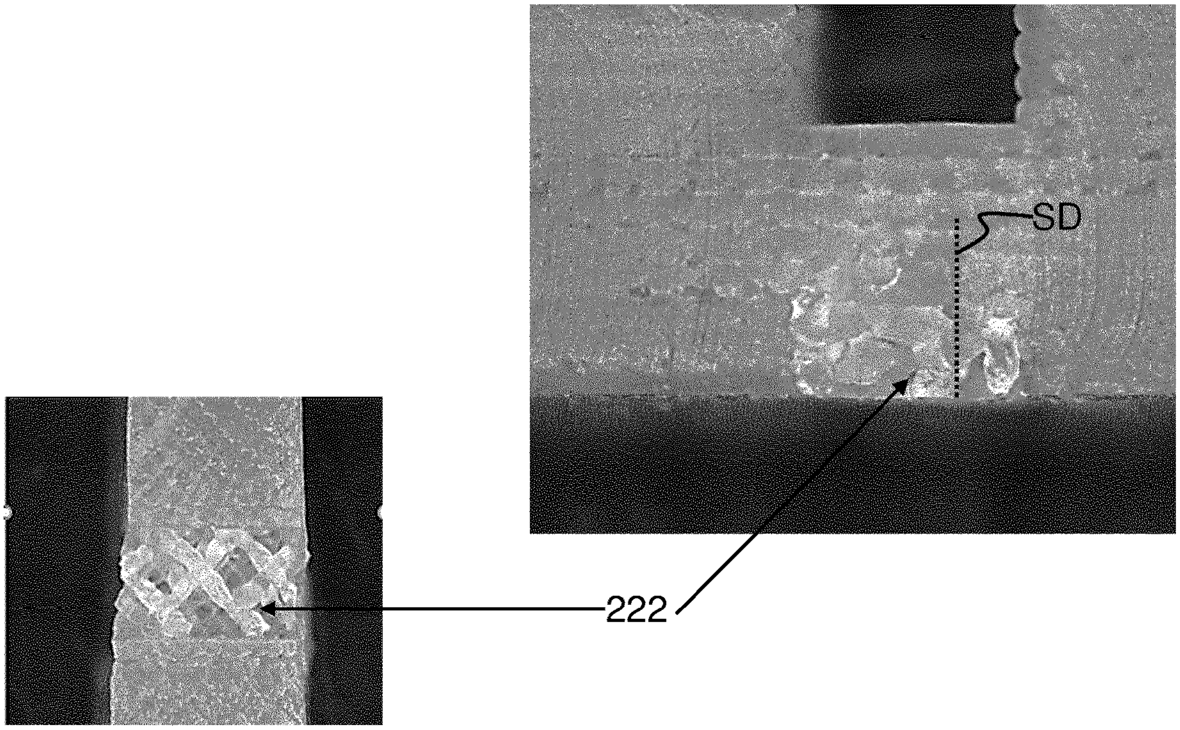
FIG. 5C provides further views of the support member shown in FIGS. 5A and 5B.

FIGS. 5A to 5C provide photographs of the first body 202 and the support member 206 occupying the first channel 204 of an exemplary fluidic device 214. Evident in these photographs is the closed porosity of the first body 202 which arises from the additive manufacturing process used for its formation. Thus, more generally, an additive manufactured body is detectable by inspection, e.g. optical inspection, of its structure.

The closed porosity of the first body 202 is such that fluid is effectively retained within the first channel 204. More generally, the fluid impermeability of the material of the first body 202 and the second body 204 is such that fluid transport within the fluidic device is via the first channel 204 (and the second channel 210, when present).

The enlarged view provided in FIG. 5B shows the open porosity of the support member 206 which provides the at least one fluid flow path along the first channel 204. This open porosity is provided in this non-limiting example by a porous structure comprising, or being defined by, interlaced strands 220A, 220B, with the at least one fluid flow path being provided between the interlaced strands 220A, 220B.

Initial additive manufacture of the first body 202 and the support member 206 may comprise forming a stack of layers in the region of the first channel 204, which stack defines the support member 206. Each layer of the stack may comprise a plurality of spatially separated portions, with the at least one fluid flow path being provided by the spaces between the spatially separated portions.

Returning to the example shown in FIG. 5B, the spatially separated portions in each layer of the stack can comprise a plurality of separate strands 220A, 220B extending parallel with each other in the layer. The direction or angle of extension of the strands 220A, 220B relative to the direction in which the first channel 204 extends may vary between layers of the stack.

The direction of extension of the strands 220A in a first layer of the stack is angled relative to the direction of extension of the strands 220B in a second, successive layer of the stack, as shown in FIG. 5B. Referring to FIG. 5C, such an arrangement in which the direction of extension of the strands in successive layers alternates in the stack in a stack direction (SD) normal to the substrate 200 can assist to support the second body 208 formed thereon. Pores 222 are defined in the spaces between the strands 220A, 220B.

Each of the strands 220A, 220B may be, for example, 150 μm to 225 μm wide. Such a strand width can assist each layer of the stack to support the layers above, as well as the second body 208 disposed on the support member 206.

Alternatively or additionally, the pore size or the distance between nearest-neighbor strands 220A, 220B of the same layer may be 50 μm to 200 μm, and the support member 206 may have a porosity in the range of 10% to 50%. This may assist to ensure fluid flow through the first channel 204, while enabling the support member 206 to support the second body 208.

More generally, at least one of the first body 202 and the second body 208 may be optically transparent or translucent, e.g. in addition to being formed of a thermoplastic elastomer and/or a material having a Shore A hardness of 20 to 70. This may facilitate optical interrogation of processes taking place within the fluidic device 214. In some examples, the material for the first body 202 and/or the second body 208 may be food contact approved.

The following exemplary commercially available elastomeric/soft materials which are transparent or translucent, have a Shore A of 10 to 70, and are food contact approved can be used, in certain embodiments, for the first and/or second bodies 202, 208: Medalist MD-53253 (TPE Teknor Apex); Medalist MD-53273 (TPE Teknor Apex); Mediprene 500602 M-03 (TPE Hexpol); Texin Rx T85A (TPU Covestro); BioSpan® (F SPU|PUR); BioSpan® (SPU|PUR); BJB Polyurethane F-116 A/B TSU; BJB Polyurethane F-126 A/B|TSU; BJB Polyurethane F-131 A/B|TSU; BJB Polyurethane M-3115 REV 1 A/B|TSU; BJB Polyurethane M-3125 A/B|TSU; CELLENE MC2248|TPE; CELLENE MC2265|TPE; CELLENE MC3038|TPE; CELLENE MC3050|TPE; CELLENE MC3061|TPE; CELLENE MC3226|TPE; CELLENE MC3239|TPE; CELLENE MC3261|TPE; Dynaflex™ G2706-1000-00|TPE; Dynaflex™ G2711-1000-00|TPE; Elastocon® 2860L|TPE; Filter-Bond™ E-3264|TS; FLEXCHEM™ 3551-02 PVC, Flexible; FLEXCHEM™ 4051-02|PVC, Flexible; FLEXCHEM™ 4551-02|PVC, Flexible; FLEXCHEM™ 5051-02|PVC, Flexible; FLEXCHEM™ 5551-02|PVC, Flexible; FLEXCHEM™ 6051-02 PVC, Flexible; FLEXCHEM™ 6551-02 PVC, Flexible; Medalist® MD-12130|TPE; Medalist® MD-12130H|TPE; Medalist® MD-12140|TPE; Medalist® MD-12140H TPE; Medalist® MD-12150|TPE; Medalist® MD-12150H|TPE; Medalist® MD-12150S|TPE; Medalist® MD-12160|TPE; Medalist® MD-12160H|TPE; Medalist® MD-12170|TPE; Medalist® MD-12170H|TPE; Medalist® MD-12243|TPE; Medalist® MD-12337|TPE; Medalist® MD-12340 NAT|TPE; Medalist® MD-12342|TPE; Medalist® MD-12344|TPE; Medalist® MD-12350|TPE; Medalist® MD-12352|TPE; Medalist® MD-12362 TPE; Medalist® MD-125|TPE; Medalist® MD-130|TPE; Medalist® MD-13240|TPE; Medalist® MD-135|TPE; Medalist® MD-145|TPE; Medalist® MD-155|TPE; Medalist® MD-17365|TPE; Medalist® MD-225|TPV; Medalist® MD-32045|TPE; Medalist® MD-32245|TPE; Medalist® MD-36048|TPE; Medalist® MD-37063 NAT TPE; Medalist® MD-42245 XRD1|TPE; Medalist® MD-42245 XRD3|TPE; Medalist® MD-74357 XRD1|TPE; Medalist® MD-74357 XRD2 TPE; Mediprene® 500120M|TPE; Mediprene® 500200M TPE; Mediprene® 500250M|TPE; Mediprene® 500300M|TPE; Mediprene® 500350M|TPE; Mediprene® 500400M|TPE; Mediprene® 500434M|TPE; Mediprene® 500450M|TPE; Mediprene®500484M|TPE; Mediprene® 500520M|TPE; Mediprene® 500534M|TPE; Mediprene® 500584M TPE; Mediprene® 500600M|TPE; Mediprene® 500634M|TPE; Mediprene® 500650M|TPE; Mediprene® 500684M|TPE; Mediprene® 500700M|TPE; Monprene® RG-10160H|TPE; ProvaMed® TPE 1120|TPE; ProvaMed® TPE 1160|TPE; RABALON® PJ4300C|TPE; RABALON® PJ5300C TPE; RABALON® PJ6300C|TPE; RABALON® PJ7300C|TPE; SkinFlex 15 F-115 A/B|TSU; SkinFlex BR-60; BRUSHABLE A/B|TSU; T-Blend® TPE-F22 SEBS; THERMOLAST® M TM3LFT (Series: MC/LF) |TPE; THERMOLAST® M TM3MED (Series: MC/tl)|TPE; THERMOLAST® M TM3RST (Series: MC/RS) TPE; THERMOLAST® M TM4LFT (Series: MC/LF) TPE; THERMOLAST® M TM4MED (Series: MC/tl) TPE; THERMOLAST® M TM4RST (Series: MC/RS) TPE; THERMOLAST® M TM5LFT (Series: MC/LF) TPE; THERMOLAST® M TM5MED (Series: MC/tl) TPE; THERMOLAST® M TM6LFT (Series: MC/LF) TPE; THERMOLAST® M TM6MED (Series: MC/tl) TPE; THERMOLAST® M TM7LFT (Series: MC/LF) TPE THERMOLAST® M TM7MED (Series: MC/tl) TPE; UNISOFT SPECIAL™ DS-35A-CL-M-01 SEBS; UNISOFT SPECIAL™ DS-55A-CL-M-01|SEBS; Versaflex™ G2705 N|TPE; Versaflex™ HC 1100-40 Translucent EU TPE; Versaflex™ HC 1348 Natural|TPE; Versaflex™ HC MT317|TPE; Versaflex™ HC MT555 TPE; Versaflex™ OM 1040X-1|TPE; CELLENE MC2248|TPE; CELLENE MC2265|TPE; CELLENE MC3038|TPE; CELLENE MC3050|TPE; CELLENE MC3061|TPE; CELLENE MC3226|TPE; CELLENE MC3239|TPE; CELLENE MC3261|TPE; ChronoPrene™ 25A TPE; ChronoPrene™ 40A|TPE (CardioTech International, Inc.); Dryflex® 500300S|TPE; Dryflex®500350S TPE; Dryflex® 500400S TPE; Dryflex® 500450S TPE; Dryflex® 500500S TPE; Dryflex®500550S TPE; Dryflex® 500600S TPE; Dryflex® 500650S TPE; Dryflex® 500700S TPE; Dynaflex™ G2701-1000-02|TPE; Dynaflex™ G2706-1000-00|TPE; Dynaflex™ G2709-1000-00 TPE; Dynaflex™ G2711-1000-00|TPE; Dynaflex™ G2712-1000-02|TPE; Dynaflex™ G2730|TPE; Dynaflex™ G2755-1000-00|TPE; Dynaflex™ G2755C|TPE; Dynaflex™ G6713-0001|TPE; Dynaflex™ G6713C|TPE; Dynalloy™ GP 7810-60T|TPE; Dynalloy™ GP 7810-70T|TPE; Dynalloy™ OBC8200-BT50|TPE; Estane® 58123 TPU|TPU-Polyether; Evoprene™ 019|SBS; Evoprene™ G 925|SEBS; Evoprene™ G 936|SEBS; Evoprene™ G 942|SEBS; Evoprene™ G 958|SEBS; Evoprene™ G 966|SEBS; Evoprene™ G 967|SEBS; Evoprene™ G 968|SEBS; Evoprene™ G 969|SEBS; Evoprene™ G 970|SEBS; Evoprene™ GC 5685|SEBS; Evoprene™ GC 5686|SEBS; Evoprene™ GC 5687|SEBS; Evoprene™ GC 5688|SEBS; Evoprene™ GC 5689|SEBS; Evoprene™ GC 5690|SEBS; GLS 422-126|TPE; GLS 458-140|TPE; GLS 458-141|TPE; GLS 458-142|TPE; K-Prene HYFLEX HF 15 MPR; K-Prene HYFLEX HF 20|MPR; K-Prene HYFLEX HF 25|MPR; K-Prene HYFLEX HF 30 MPR; Medalist® RG-38052 XRD1|TPE; Megol® PUG 10|SEBS; Megol® PUG 60|SEBS; Megol® TA 60|SEBS; Monprene® RG-10130|TPE; Monprene® RG-10140|TPE; Monprene® RG-10150 TPE; Monprene® RG-10160 TPE; Monprene® RG-10170 TPE; Monprene® RG-15130 TPE; Monprene® RG-15140 TPE; Monprene® RG-15150|TPE; Monprene® RG-15160|TPE; Monprene® RG-15170|TPE; Monprene® RG-18240|TPE; Monprene® RG-18250|TPE; Monprene® RG-18260 TPE; Monprene® RG-18270|TPE; Monprene® RG-19221 NAT|TPE; Monprene® RG-19255|TPE; Monprene® RG-20140|TPE; Monprene® RG-20160 TPE; Monprene® RG-20170|TPE; Monprene® RG-29068 NAT TPE; Monprene® RG-29240 XRD1|TPE; RABALON® MJ4300C|TPE; RABALON® MJ5302C TPE; RABALON® MJ6301C|TPE; RABALON® MJ7301C|TPE; RAYPRENE® NB221-S4050| TPE; RAYPRENE® NB221-S4051|TPE; RAYPRENE® NB221-S4052|TPE; RAYPRENE® NB221-S4053|TPE; Tefabloc® TO 132 TPE; Telcar® TL-83-F943D22-NT BLU|TPE; THERMOLAST® K TF2CGT (Series: FC) TPE; THERMOLAST® K TF3BTL (Series: FC/AP) TPE; THERMOLAST® K TF3CGT (Series: FC) TPE; THERMOLAST® K TF3STE (Series: FC/CS) TPE; THERMOLAST® K TF4AAB (Series: FC/HE/tl) TPE; THERMOLAST® K TF4BTL (Series: FC/AP) TPE; THERMOLAST® K TF4CGT (Series: FC) TPE; THERMOLAST® K TF4STE (Series: FC/CS) TPE; THERMOLAST® K TF5AAC (Series: FC/HE/tl) TPE; THERMOLAST® K TF5BTL (Series: FC/AP) TPE; THERMOLAST® K TF5CGT (Series: FC) TPE; THERMOLAST® K TF5STE (Series: FC/CS) TPE; THERMOLAST® K TF5WHA (Series: DW/H) TPE; THERMOLAST® K TF6AAF (Series: FC/HE/tl) TPE; THERMOLAST® K TF6BTL (Series: FC/AP) TPE; THERMOLAST® K TF6CGT (Series: FC) TPE; THERMOLAST® K TF6STE (Series: FC/CS) TPE; THERMOLAST® K TF6WCS (Series: DW/CS) TPE; THERMOLAST® K TF6WHA (Series: DW/H) TPE; THERMOLAST® K TF6WHB (Series: DW/H) TPE; THERMOLAST® K TF7AAC (Series: FC/HE/tl) TPE; THERMOLAST® K TF7BTL (Series: FC/AP) TPE; THERMOLAST® K TF7CGT (Series: FC) TPE; THER- MOLAST® K TF7WHB (Series: DW/H) TPE; Topolymer® 8201-B|TPE; Versaflex™ FFC 2882-50 EU|TPE; Versaflex™ FFC 2882-50|TPE; Versaflex™ G2708 N|TPE; Versaflex™ GP 2810-20N TPE; Versaflex™ GP 2810-30N TPE; Versaflex™ GP 2810-40N TPE; Versaflex™ GP 2810-50N TPE; Versaflex™ GP 2810-60N TPE; Versaflex™ GP 2810-70N TPE; Cawiton® MT920|SEBS; Cawiton® MT930|SEBS; Cawiton® MT940|SEBS; Cawiton® MT950|SEBS; Cawiton® MT960|SEBS; Cawiton® MT970|SEBS.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A method of fabricating a fluidic device, the method comprising:

providing a substrate, in which a first channel is defined, wherein a support member is provided in the first channel;

forming, in an additive manufacturing process, a second body supported by the first body, and the support member, wherein the support member comprises at least one fluid flow path therethrough for permitting fluid transport along the first channel while the support member is supporting the second body, and wherein the support member comprises a porous structure whose pores define the at least one fluid flow path;

wherein the first body and the support member are in direct contact with the substrate at distinct locations;

wherein forming the support member comprises forming a stack of layers in a region of the first channel, each layer of the stack comprising a plurality of spatially separated portions, the at least one fluid flow path being provided by spaces between the spatially separated portions; and wherein the spatially separated portions in each layer of the stack comprise a plurality of separate strands extending parallel with each other in each layer of the stack.

2. The method according to claim 1, wherein the providing comprises forming, in an initial additive manufacturing process, the first body and the support member on the substrate.

3. The method according to claim 1, wherein a direction of extension of the strands varies between layers of the stack.

4. The method according to claim 3, wherein the direction of extension of the strands alternates in successive layers.

5. The method according to claim 1, wherein a second channel is defined in the second body.

6. The method according to claim 5, wherein a portion of the second body is interposed between the second channel and the support member.

7. The method according to claim 5, wherein at least part of the second channel aligns with the first channel in a direction normal to the substrate.

8. The method according to claim 5, further comprising applying a cover member to the second body to cover the second channel.

9. The method according to claim 1, wherein at least one of the first body and the second body is or are formed of a thermoplastic elastomer.

10. The method according to claim 1, wherein the porous structure comprises interlaced strands, wherein the at least one fluid flow path is provided between the interlaced strands.

11. The method according to claim 1, wherein the support member is formed of a support material whose hardness is greater than that of a material forming at least one of the first body and the second body.

12. The method according to claim 1, wherein the support material and the material forming at least one of the first body and the second body are hydrophobic.

13. A fluidic device comprising:

a first body in which a first channel is defined, wherein a support member is provided in the first channel;

an additive manufactured second body supported by the first body and the support member, wherein the support member comprises at least one fluid flow path therethrough configured to permit fluid transport along the first channel, and wherein the support member comprises a porous structure whose pores define the at least one fluid flow path;

wherein the first body and the support member are in direct contact with a substrate at distinct locations;

wherein the support member comprises a stack of layers in a region of the first channel, each layer of the stack comprising a plurality of spatially separated portions, the at least one fluid flow path being provided by spaces between the spatially separated portions; and wherein the spatially separated portions in each layer of the stack comprise a plurality of separate strands extending parallel with each other in each layer of the stack.

14. The fluidic device according to claim 13, further comprising the substrate arranged to support the first body.

15. The fluidic device according to claim 13, wherein a second channel is defined in the second body; optionally wherein the fluidic device further comprises a cover member on the second body, which cover member covers the second channel.

* * * * *